(12) United States Patent
Keiner et al.

(10) Patent No.: US 11,607,032 B2
(45) Date of Patent: Mar. 21, 2023

(54) TEETH CLEANING DEVICE AND CARRIER STRUCTURE FOR MOUTHPIECE OF A TEETH CLEANING DEVICE

(71) Applicant: BLBR GmbH, Grünwald (DE)

(72) Inventors: Michael Keiner, Braunfels (DE); Norbert Sörgel, Grünwald (DE)

(73) Assignee: BLBR GMBH, Grünwald (DE)

( * ) Notice: Subject to any disclaimer, the term of this patent is extended or adjusted under 35 U.S.C. 154(b) by 455 days.

(21) Appl. No.: 16/959,206

(22) PCT Filed: Oct. 23, 2018

(86) PCT No.: PCT/EP2018/079009
§ 371 (c)(1),
(2) Date: Jun. 30, 2020

(87) PCT Pub. No.: WO2019/141393
PCT Pub. Date: Jul. 25, 2019

(65) Prior Publication Data
US 2020/0405043 A1 Dec. 31, 2020

(30) Foreign Application Priority Data

Jan. 19, 2018 (EP) ................................. 18152472
Jul. 25, 2018 (EP) ................................. 18185450

(51) Int. Cl.
*A46B 9/04* (2006.01)
*A61C 17/22* (2006.01)
*A61C 17/34* (2006.01)

(52) U.S. Cl.
CPC ............ *A46B 9/045* (2013.01); *A61C 17/228* (2013.01); *A61C 17/3481* (2013.01)

(58) Field of Classification Search
CPC ... A61C 17/228; A61C 17/3481; A61C 17/34; A46B 9/045
See application file for complete search history.

(56) References Cited

U.S. PATENT DOCUMENTS

2017/0265638 A1 9/2017 Sagynaliev et al.

FOREIGN PATENT DOCUMENTS

CN 102481183 A 5/2012
DE 202009008362 U1 11/2009

(Continued)

*Primary Examiner* — Shay Karls
(74) *Attorney, Agent, or Firm* — Dickinson Wright PLLC

(57) ABSTRACT

The present invention provides a holder and support structure or carrier structure for a mouthpiece of a teeth cleaning device which enables cleaning of a plurality of teeth, preferably all of the user's teeth at the same time, wherein the carrier structure comprises a mouth insert for the user's upper jaw and a mouth insert for the user's lower jaw; and a coupling section including two arms and a connecting section for the drive device, wherein the mouth inserts are each connected to an arm of the coupling section and the connecting section for the drive device is adapted so that it can be connected to a drive device via a fastener thereof, wherein the arms of the coupling section that are connected to the mouth inserts each include at least one spring section. The spring sections assure an even transfer of vibration transfer along the entire length of the mouth inserts. In one embodiment, the horizontal spring sections of the carrier structure allow it to be adjusted more precisely to the user's dentition.

26 Claims, 6 Drawing Sheets

(56) References Cited

FOREIGN PATENT DOCUMENTS

| | | | |
|---|---|---|---|
| DE | 102014008956 A1 | 12/2015 | |
| DE | 102015109891 A1 | 12/2016 | |
| WO | WO-0247512 A1 * | 6/2002 | ............. A46B 9/045 |
| WO | 2009137671 A1 | 11/2009 | |

* cited by examiner

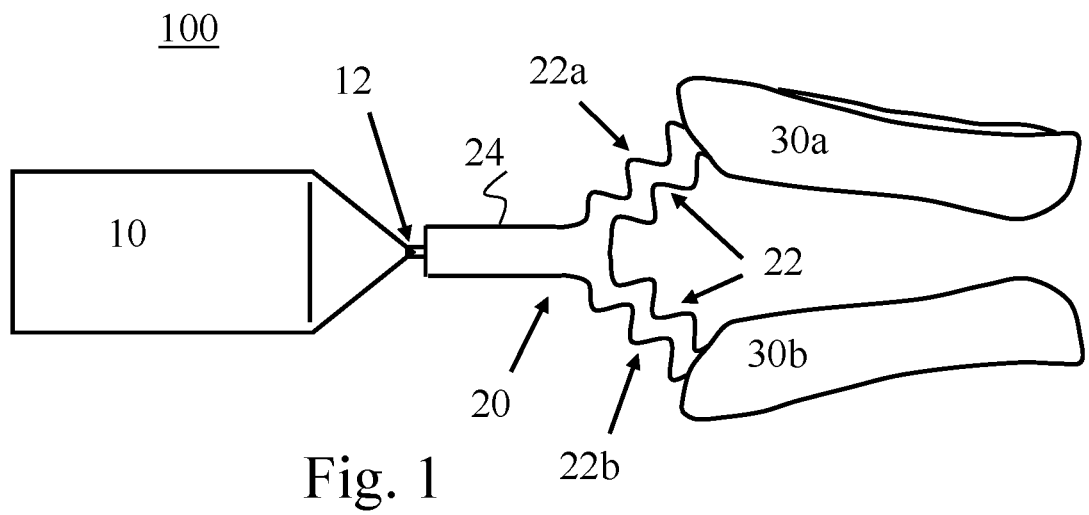
Fig. 1
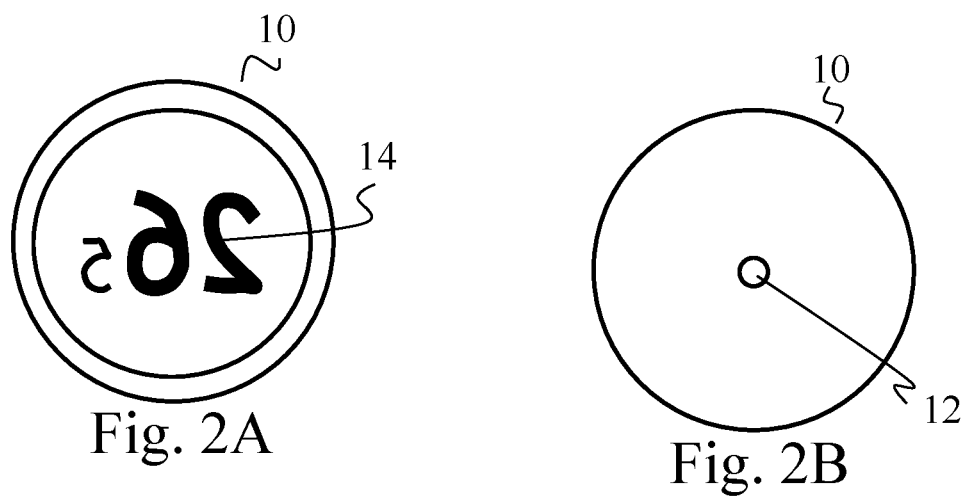
Fig. 2A
Fig. 2B

TEETH CLEANING DEVICE AND CARRIER STRUCTURE FOR MOUTHPIECE OF A TEETH CLEANING DEVICE

CROSS-REFERENCE TO RELATED APPLICATIONS

This application is a U.S. National Stage of International Application No. PCT/EP2018/079009, filed on Oct. 23, 2018, which claims the benefit and priority of European patent application EP 18 152 472.9 filed on Jan. 19, 2018 and that of EP 18 185 450.6 filed on Jul. 25, 2018, the entire contents of which are incorporated herein by reference.

TECHNICAL FIELD

The present invention relates to a holder and support structure or carrier structure for a mouthpiece of a teeth cleaning device, a mouthpiece having such a carrier structure and a teeth cleaning device associated therewith. In particular, the invention relates to a carrier structure for a teeth cleaning device and a teeth cleaning device which enables cleaning of a plurality of teeth, preferably all of the user's teeth at the same time, and a corresponding adaptation method, wherein spring sections (also identified as "suspension sections") in a coupling element between a mouthpiece and a drive device of the teeth cleaning device enable more even vibration transfer and thus also an improved cleaning result. In one embodiment, horizontal spring sections of the carrier structure allow it to be adjusted more precisely to the user's dentition.

DESCRIPTION OF THE RELATED ART

Cleaning teeth is the basis of individual prophylaxis for tooth preservation. Primary aims are the removal of bacterial plaques (caries, periodontitis), and the removal of food residues and foreign bodies. Secondary aims are fluoride application by means of toothpastes for increasing the resilience of the teeth, particularly the tooth enamel, to acidic metabolites of the bacteria in the oral cavity.

The most widespread and also cheapest model is the manually guided short-headed toothbrush. A few regions in the mouth can better be reached in the mouth by means of a small brush head, which is why high-quality manual toothbrushes often have a short head, medium-hard to soft plastic bristles with rounded bristle ends and an ergonomic handle, which allows reliable guidance.

Another popular method for cleaning teeth is to use an oscillating-rotating rotary toothbrush, which stands out due to a round rotating or oscillating brush head. The functioning principle is similar to a tooth polishing tool. The cleaning performance of oscillating-rotating brush heads is, according to a study, slightly better than that of manual toothbrushes.

The electronic sonic toothbrush is a further development of the electric toothbrush. In this case, the brush head is moved with a higher frequency than in the case of conventional electric toothbrushes, usually with a frequency of 250 to 300 Hz.

A more recent development is the ultrasonic toothbrush, which works at oscillation frequencies above 300 Hertz. Ultrasonic toothbrushes can operate at up to 1.8 million oscillations per second (1.8 Mhz). Devices of this type operate with a swab which sets the liquid in the mouth oscillating and causes foam bubbles, created with the aid of a special toothpaste, to burst. It is this bursting of the bubbles that creates the cleaning effect. Ultrasonic toothpaste does not contain any cleaning particles, which means that the cleaning action is no longer mechanical.

It is common to all the abovementioned teeth cleaning methods that the actual cleaning of the tooth surfaces must be carried out by the user. Regardless of the form chosen for the teeth cleaning, the user has to guide a brush head which only has a size of a few millimetres, over the respective tooth surfaces using various techniques. In this context, a very wide range of applied for performing a practical cleaning motion (in circles, back and forth strokes). Approximately 2.5 to 3 minutes in total are therefore required just for the cleaning activity, in order to carefully clean normal human dentition.

However, manual cleaning by the user is associated with serious deficiencies:

With manual cleaning, there is always the danger that some teeth or tooth surfaces may be forgotten.

The user may exert too much or too little pressure with the brush head.

Incorrect technique may result in residual food particles or plaque getting into the spaces between the gingiva and the tooth and causing problems there.

Toothbrush heads are generally not stored with any particular hygiene precautions, and accordingly they may themselves become reservoirs for disease carriers.

Manual tooth cleaning takes 2.5 to 3 minutes twice a day, which is too much time.

In order to mitigate these drawbacks, the tooth cleaning process should be automated and adapted individually to the shape and size of the user's teeth and jaw as far as possible. In particular, a fast, reliable and thorough tooth cleaning technique is desirable, and this is what has let to the development in recent years of tooth cleaning systems for a user's entire dentition.

Patent application DE 102015109891 A1, which was developed by the inventors of the present application, discloses such a teeth cleaning device for simultaneously cleaning multiple, preferably all teeth of the user. In this context, a mouth insert is connected to a vibrating motor via a coupling and causes the teeth cleaning device to vibrate. If the mouth insert consists of two parts, two couplings are preferably used (see FIGS. 5A, 5B and 6 in DE 102015109891 A1) to connect each mouthpiece individually to two separate vibrating motors. However, two single motors result in greater weight and greater vulnerability to breakdown. Moreover, the greater weight means that the system cannot be operated without holding it, although this is essential in order to achieve a uniform cleaning effect in the course of one or more applications, since the influence of the user can lead to possible malfunctions, axial shifts or pressure points.

In a short passage in DE 102015109891 A1, the possibility is also discussed of coupling a single motor to both mouthpieces. However, such a configuration of the tooth cleaning system detracted significantly from the cleaning result, in particular an unsatisfactory cleaning effect was observed in the region of the front teeth. It must be assumed that an axial shift and uneven pressure points are created by the operation of two mouthpieces with a single motor, which in turn impedes a perfect cleaning procedure. This embodiment was therefore rejected at that point. The further development of the present invention adopts this approach again.

In DE 102015109891 A1, the mouthpieces are also manufactured according to the individual specifications for each user. For this, first the dentition structure is scanned, the scanned data is then transformed into a design file which is then produced in a 3D printing process, preferably in a laser sintering procedure. This manufacturing technique is very labour-intensive and also prone to error. First, a scan must be made of the dentition with an intraoral scanner. In the next step, a 3D model of the dentition is generated from the scan data, and on the basis of this a design file is created for the mouth inserts. Finally, the mouth inserts are produced in the 3D printing process. Any error in the scan is then carried forward throughout the entire production process.

The deficiencies in the related art are to be corrected by the construction of a fully automated teeth cleaning appliance which is adapted to the individual user. Chemical, kinetic and mechanical cleaning properties are to complement each other in such manner that a practically ideal cleaning and care result is achieved, for both the teeth and the gingiva. The adaptation method of the present invention is further designed to favour inexpensive production in large numbers. Manufacturing errors are to be largely eliminated by the automated production method.

SUMMARY OF THE INVENTION

The present invention is represented by the accompanying claims. The following disclosure is intended to facilitate understanding of the present invention.

In a first preferred embodiment of the disclosure, a carrier structure is provided for a teeth cleaning device for the simultaneous cleaning of multiple, preferably all of a user's teeth. The carrier structure may form a section of a mouthpiece which comprises the carrier structure and a silicone shell or other relative soft cleaning structures. The task of the carrier structure is to maintain the tension of the mouthpieces and most importantly to transmit vibrations from a drive device to the user's teeth. The carrier structure comprises at least one mouth insert for the user's upper jaw and at least one mouth insert for the user's lower jaw. A mouth insert (for the upper or lower jaw) is preferably adapted for all of the teeth in the upper or lower jaw. However, the mouth inserts may also be constructed in multiple parts, e.g., with one section each for the teeth on the left and right side of the respective jaw or one section each for the inner and outer tooth faces and the chewing surface flanks. However, the variant with exactly one mouthpiece each for the upper and the lower jaw is preferred. The mouth inserts preferably comprise a stable base mounting (also referred to as the base element in the following text), which functions as a vibratory coupling with a drive unit. This base element essentially comprises a biocompatible material which preferably conforms to EN ISO 10993-1 and/or is certified for contact with food according to the EU Plastic Materials Directive 2002/72/EC. The use of biocompatible polyamide (homo- and/or copolyamide) such as PA6, PA12, PA11, or most preferably PA6.6 is preferred. In another embodiment, polyamide 12 in version PA 2200 (white) or PA 2201 (transparent) for example is used to manufacture the base element of the mouth inserts. In one embodiment, the entire base element is manufactured as a single part ("integrally formed") entirely from the biocompatible material described above.

In a preferred embodiment, the carrier structure also comprises a coupling section, which has at least two arms and a connecting section for the drive device, wherein the at least two mouth inserts are each connected to an arm of the coupling section, and the connecting section for the drive device is adapted to be connected to a drive device. In other preferred embodiments each of the mouth inserts may also be connected to the connecting section for the drive device by two or more arms. Thus, the teeth cleaning device of the disclosure is characterized in that the arms of the coupling section which are connected to the mouth inserts each include at least one spring section. The spring sections are preferably less rigid than the other regions of the arms or of the arms without springs and are highly flexible, so that the spring sections bias the mouth inserts towards a normal position when under load. The spring sections enable the mouth inserts to be placed in the oral cavity more easily. The spring-loaded coupling section also serves to damp the mutual natural resonant vibrations of the mouth inserts. It should be noted that in some embodiments the spring sections may extend over the entire length of an arm (see for example the figures of the application). The spring sections preferably extend over 20%-100% of the length of a spring-loaded arm and in in particular over 35%-95% or particularly preferably 65%-90% of the arm.

In one embodiment of the carrier structure, the mouth insert for the user's upper jaw and the mouth insert for the lower jaw are connected to each other at the ends thereof that are located opposite the coupling section. By this is meant the sections of the mouth inserts that are provided for cleaning the molars. In one embodiment, the mouth inserts have a trough-shaped cross section which is formed by a carrier structure bottom, the shape of which substantially resembles that of the occlusal surface of a set of human teeth (transverse plane of the human body), an outer wall and an inner wall. The outer walls each have a recess in the region of the pivot spring section which is bridged by a vibration coupling mechanism. The vibration coupling mechanisms may optionally include a first coupling section and a second coupling section, which are arranged on opposite sides of the recess in the outer wall, and extend towards each other and touch each other. In one embodiment, the carrier structure may be made of homo- or copolyamide, preferably food-safe homo- or copolyamide, more preferably PA 6, PA, 6.6, PA 4.6, PA 11, PA 12, PA 1010, PA 610, copolyamides or polyamide mixtures thereof, and particularly preferably PA 6.6, copolyamides or polyamide mixtures thereof.

The spring sections of the coupling section also serve to improve the transfer of vibrations to the user's teeth. In a conventional, rigid connection as is used in the related art described earlier, the amplitude of the vibration of the mouthpieces increases with increasing distance from the coupling point with the coupling section towards the free end on the user's premolars and molars. Consequently, with a conventional device the incisors are barely cleaned at all while the high amplitude can damage or cause increased erosion to the premolars and molars.

In a variation of the first preferred embodiment of the present disclosure, at least one of the mouth inserts has a first mouth insert section and a second mouth insert section which are connected to a mouth insert spring section or pivot spring section that is less rigid in the plane of the dentition (transverse plane of the human body) which extends substantially parallel to and between the mouth inserts than the first and second mouth insert sections, on order to make it easier to change the shape of the respective mouth insert in the plane of the dentition. In this context, the plane of the dentition is defined as the sides of the mouth inserts that correspond to the chewing surfaces of the user's teeth.

In a second preferred embodiment of the disclosure, a carrier structure for a teeth cleaning device is provided for the simultaneous cleaning of multiple, preferably all of a user's teeth. The carrier structure of the second preferred embodiment comprises a mouth insert for the user's upper jaw and a mouth insert for the user's lower jaw, and a coupling section that includes two arms and a connecting section for the drive device, wherein the mouth inserts are each connected to an arm of the coupling section and the connecting section is adapted for the drive device so that it may be connected to a drive device via the carrier structure thereof. The second embodiment differs from the first embodiment in that the carrier structure only optionally has arms with spring sections, and instead at least one of the mouth inserts comprises a first mouth insert section and a second mouth insert section which are connected to a pivot springs section which is less rigid in the plane of the dentition which extends substantially parallel to and between the mouth inserts than the first and second mouth insert sections in order to make it easier to deform the respective mouth insert in the plane of the dentition. In other words, in the second embodiment the arms of the coupling section of the carrier structure do not have to be equipped with the at least one spring section. However, it is explicitly advantageous, and therefore desirable that the first and second embodiments be combined with one another.

Accordingly, the carrier structure of the second embodiment may also have such coupling section arms which are connected to the mouth inserts and are each provided with at least one spring section. The spring deflections of the spring sections in the arms of the carrier structure in the first preferred embodiment (in the sagittal plane of the human body) are substantially perpendicular to the spring deflection of the pivot spring section of the second preferred embodiment (in the transverse plane of the human body).

In the carrier structure of any of the embodiments described above, the mouth inserts may optionally each be adapted for cleaning the teeth of the user's entire upper jaw or the entire lower jaw.

In the carrier structure of a preferred embodiment, the coupling section is constructed integrally with the spring sections. In the carrier structure of another preferred embodiment, the spring sections are constructed integrally with the mouth inserts and/or with the sections of the respective arm without a spring. The single-part construction improves the transfer of vibration between the drive device and the mouthpiece. In addition, interior spaces are avoided which might necessitate greater cleaning effort or impair the hygiene conditions of the device. In a preferred embodiment, the coupling section is made of exactly the same material, preferably biocompatible polyamide (particularly preferably PA 6.6 or PA 12 such as PA 2200 or PA 2201) as the base elements of the mouth inserts so that the natural resonance behaviour may be monitored more closely.

In the carrier structure of another preferred embodiment, the spring sections can be replaced with plug or screwed connections. Such a modular construction of the coupling section makes it possible to carry out maintenance activities which may make it unnecessary to replace the entire coupling section.

In the carrier structure of a preferred embodiment, the spring sections are tapered compared with the arm of the coupling section to which they are connected, and arranged with an up and down curve or S-structure. The tapering of the coupling sections may be created by flattening (e.g. by the effect of heat and pressure or rolling) the respective arms of the coupling section, and the S-shape achieved by subsequently bending the flattened arms upwards and downwards in the plane that extends lengthwise through the arms and the connecting section for the drive device of the coupling section, that is to say in the vertical plane of symmetry of the user's dentition.

In the carrier structure of another preferred embodiment, the spring sections are formed by a plurality of notches on the outer sides and/or the inner sides of each of the arms of the coupling section. The spring sections may preferably be formed by recesses (or "cuts") on the outer sides of the coupling section arms or alternatingly and offset with respect to each other on the outer and inner sides of the coupling section, which extend perpendicularly to the longitudinal axis of the respective arm and cut at least as far as halfway into to the respective arm. In a particularly preferred embodiment, however, the carrier structure is produced directly by injection moulding or vacuum injection moulding, so that post-treatment by notching and/or heating and flattening, while possible, it not necessary. Instead, the shape of the spring sections may be defined directly by the corresponding design of the casting mould.

In the carrier structure of a preferred embodiment, the connecting section for the drive device of the coupling section is constructed as an additional, third arm, which extends from a connecting point of the two arms that are connected to the mouth inserts, and wherein the third arm optionally comprises an additional spring section. The longitudinal cross section through the three arms may preferably have a Y-shape. Alternatively, the cross sections may be in the shape of a tuning fork or, without the third arm, a U-shape or horseshoe shape. Instead of the third arm, the drive device coupling section may also be provided directly at the place where the two arms connected to the mouthpieces meet.

In the carrier structure of a preferred embodiment, the mouth inserts each comprise a base element made of biocompatible material, preferably biocompatible polyamide, which has been adapted roughly to the shape of the teeth in a user's lower jaw or upper jaw. The base element is responsible for transmitting the vibrations to the surfaces to be cleaned, and in one embodiment is made entirely from a biocompatible polyamides. Particularly preferred is the use of biocompatible polyamide such as PA6, PA6.6, PA11, or PA12, more preferably PA 6.6. In one embodiment, polyamide 12 is used to manufacture the base element of the mouth inserts, e.g. in the embodiment PA 2200 (white) or PA 2201 (transparent). Optionally, other additives, dyes and/or reinforcing fibres may be added to the polyamide.

Besides this, the mouth inserts of the embodiment also comprise an insert element which is made of a thermoplastic material and is affixed (e.g. by bonding, impressing or with a type of hook-and-eye fastener) to the inner sides of the base element, that is to say the sides that face the user's teeth when the device is in use, and is adapted to match a shape of the user's lower jaw or upper jaw dentition perfectly. In one embodiment, a thermoplastic elastomer is used as the thermoplastic material. Preferred among these substances are polycaprolactone (PCL), e.g., Polydoh® marketed by Polymorph, thermoplastic polyester elastomer TPE-E, e.g. Keyflex® marketed by LG Chemie, urethane-based thermoplastic elastomer TPE-U, e.g., Elastollan® (BASF), or mixtures thereof. Optionally, additives or reinforcing fibres may be added to these materials.

In the carrier structure of one embodiment, the inner sides of each base element which serve to fasten the insert element have a mesh-like network structure to improve the connection between the base element and the insert element. The outer sides of the base element are preferably smooth to facilitate cleaning and avoid irritation of the buccal mucosa.

In the carrier structure of one embodiment, the inner sides of the insert elements, that is to say the cleaning surfaces facing the user's teeth each have a multiplicity of cleaning structures. The cleaning structures may comprise rubber coating layers which attached to the inner surfaces of the insert element, cleaning elements conformed integrally with surface regions of the insert element, and/or strip brushes attached to the inner surfaces of the insert element. Examples and more complete descriptions of the cleaning structures and the implementation thereof are described in DE 102015109891 A1, FIGS. 4 and [0050]. Accordingly (with reference to FIG. 4 of DE 102015109891 A1, wherein this figure is incorporated by reference), the cleaning structures may be provided in the form of cleaning elements on the surface of the mouth insert. In this case, these are all cleaning elements which are conformed on the surface of the mouth insert and integrally therewith. In this embodiment, the cleaning elements provided in the region of the chewing surfaces are rhombus-shaped, in the region of each of the front and rear tooth surfaces the cleaning elements are cylindrical. The rhombic shape of the cleaning elements lends them greater hardness than the cylindrical cleaning elements, so a more intensive tooth cleaning effect is achieved in the region of the chewing surfaces. Of course, the cleaning elements on the front and rear tooth surfaces may be shaped differently. Equally, other cleaning structures such as rubber coating layers and/or strip brushes might also be provided in each of the regions shown, i.e. in the regions of the rear tooth surfaces, the chewing surfaces and the front tooth surfaces.

The present invention further provides a mouth insert that comprises a carrier structure according to one of the preferred embodiments described above and also a silicone shell which substantially completely surrounds the carrier structure. The silicone shell is preferably produced as a single part ("integrally formed"), for example by vacuum injection moulding. The silicone shell has a shape which roughly corresponds substantially to a negative impression of human dentition. However, a certain space should be provided, wherein the space is bridged with cleaning structures on the surfaces of the silicone shell facing the user's teeth, which cleaning structures are in direct contact with the tooth surfaces to assure the cleaning effect of the teeth cleaning device with the carrier structure of this embodiment. The cleaning structures are preferably silicone fins arranged perpendicularly (parallel to the spaces between the teeth, i.e. perpendicular to the transverse plane of the human body), which are preferably constructed integrally with the silicone shell. During the fitting process, the silicone shell is inverted or pulled over the carrier structure. Because of the small number of individual components, maintenance of the carrier structure and the silicone shell which together form the mouthpiece in this preferred embodiment is simpler and less expensive.

The present invention further provides a teeth cleaning device comprising a carrier structure and mouthpiece according to the preceding description and a drive device which is connected to the drive device coupling section of the coupling section.

In one embodiment, the teeth cleaning device comprises a drive device which includes a housing, for example, and in the housing a motor (sonic transducer), a battery or rechargeable battery (e.g. lithium-ion rechargeable battery), a controller and control board (e.g., processor, motor controller and a data memory with instructions for the motor controller) and a display device (e.g., LED display, individual coloured LED lamps or e-ink display).

In the teeth cleaning device of a preferred embodiment, the drive device is adapted to transmit an oscillation of 100 Hz to 500 Hz, preferably 200 Hz to 350 Hz, over the Y-shaped coupling section to the mouth inserts. In these frequency ranges, a good cleaning result is achieved in a short time.

In the teeth cleaning device of a preferred embodiment, the drive device is adapted to oscillate the coupling section and the mouth inserts in a plane, preferably in a sinusoidal curve corresponding to the plane in which the arms of the coupling section are aligned, that is to say perpendicularly to the plane of the dentition. The movements ensure a dynamic flow of fluid. Toothpaste or a similar composition and saliva are mixed together gently to form an oxygen-rich foaming liquid. This is spread throughout the oral cavity, including behind and between the teeth and along the gingival margin, where the plaque-biofilm bacteria collect. A teeth cleaning device that is powered by a vibration motor in the oscillation range described previously is able to remove up to four times more plaque than a manual toothbrush. In this way, the spring sections ensure the uniform transfer of vibrations to the entire length of the mouth inserts, from the incisors to the molars.

The present disclosure further provides a method for adapting a mouth insert to a carrier structure of a teeth cleaning device which is suitable for the simultaneous cleaning multiple, preferably all teeth of a user. In this context, the carrier structure preferably conforms to one of the embodiments described above. In the embodiment, the method consists of preparing an insert element made from a thermoplastic elastomer, heating the insert element to a temperature that enables simple plastic deformation of the insert element.

This temperature is preferably higher than human body temperature (approx. 37° C.) and lower than a temperature which would cause the user significant discomfort during the subsequent adaptation process (approx. 70° C.). The preferred temperature range is between 30° C. and 60° C., and particularly preferably between 35° C. and 50° C. The method further consists of fitting the heated insert element in the user's oral cavity; pressing the heating insert element against the teeth in the user's upper and lower jaws; removing the insert element from the user's oral cavity and allowing the insert element to cool and cure. In an optional embodiment, reshaping of the insert element after the method is completed by (unintentional) reheating above the temperature indicated earlier may be avoided by the addition of crosslinking agents in the heating and/or cooling bath.

In an adaptation method of a preferred embodiment, the adaptation method further comprises the assembly of the insert element with a base element or carrier structure according to the preceding description, which is adapted roughly to a shape of the teeth in the user's lower jaw or upper jaw after the step of cooling or between the steps of removal and cooling. The process of pressing the insert element in the user's oral cavity is made easier by the separation of the base element from the insert element.

BRIEF DESCRIPTION OF THE DRAWINGS

FIG. 1 is a vertical longitudinal cross-section view of a teeth cleaning device according to one embodiment of the present disclosure.

FIG. 2A is a view of the underside of a drive device according to an embodiment of the present disclosure.

FIG. 2B is a view of the upper side of a drive device according to an embodiment of the present disclosure.

DETAILED DESCRIPTION OF THE PREFERRED EMBODIMENTS

Figure 3A:
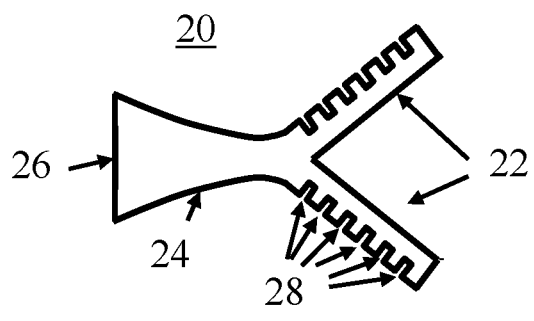
FIGS. 3A to 3D are each vertical longitudinal cross-section views of coupling sections of various embodiments and the spring sections thereof according to the present disclosure.

In the following, the present disclosure will be described with reference to figures that show schematic representations of various exemplary embodiments. The embodiments represented in the figures are not shown to scale, wherein in some cases dimensions were chosen that highlight the principle of the present invention more clearly.

Both in the description and in the figures, identical or similar reference signs are used to refer to identical or similar elements or components. In order to keep the description concise, elements that have already been mentioned in other figures are not necessarily mentioned again explicitly in the descriptions of each subsequent figure. It should also be understood that all embodiments shown are compatible and combinable with each other without restriction unless otherwise indicated in the description.

FIG. 1 is a vertical longitudinal cross-section view of a teeth cleaning device according to one embodiment of the present disclosure. As represented in FIG. 1, the teeth cleaning device of this embodiment comprises a drive device 10, a coupling section 20 and two mouth inserts 30a and 30b, one each of the upper jaw and the lower jaw of a user of the teeth cleaning device. The coupling section 20 here comprises two arms 22, which are coupled to the mouthpieces 30a, 30b or constructed integrally therewith. The arms 22 each have a spring section 22a, 22b, which in this case are constructed as multiple bends (e.g. S-shaped) in the vertical (relative to the position during use). A connecting section 24 for the drive device serves to connect coupling section 20 and drive unit 10. Here, the connecting section 24 for the drive device has the form of a third arm, which extends away from the connecting point of the arms 22. In this embodiment, the mouthpieces 30a, 30b, the coupling section 20 and the connecting section 24 for the drive device together form a carrier structure according to the present disclosure. Alternatively, however, other parts may also be included in a carrier structure.

FIG. 2A is a view of the underside of a drive device 10 according to an embodiment of the present disclosure. FIG. 2B is a view of the upper side of a drive device 10 according to an embodiment of the present disclosure. The drive device 10 of the embodiment includes a housing in which are arranged a motor (e.g. a sonic transducer), a rechargeable battery (e.g. lithium-ion rechargeable battery), a controller and control board (e.g. processor, motor controller and a data memory with instructions for the motor controller) and a display device, e.g., a LED display, individual coloured LED lamps or e-ink display 14. The individual elements are preferably insulated in waterproof or splash-proof manner from the external environment. Only the display device 14 can be viewed by a user. In addition, one or more switches (not shown) may be arranged on the housing to enable controller settings to be made or the operating state of the drive device to be changed. The rechargeable battery is charged with energy in a charging state, e.g. in a charging station (not shown), preferably wirelessly (by induction).

The drive device 10 is connected to the coupling section 20 (e.g., FIG. 1) via a fastener 12 (FIGS. 1 and 2B). In the embodiment represented in FIG. 2B, the fastener is a round pin flattened on one side to prevent the drive device 10 from rotating relative to the coupling section 20. In this embodiment, the coupling section 20 has a correspondingly shaped opening (suggested in FIG. 3A with reference sign 26) on the connecting section 24 for the drive device which assures a secure but detachable connection between coupling section 20 and drive device 10 and efficient transfer of vibration between them.

The drive device 10 is preferably operated by means of a sonic transducer which is powered by rechargeable batteries and can be regulated steplessly from 100 to 500 Hz, preferably 200 Hz to 350 Hz. The vibration frequency and amplitude are generated for example by an eccentrically rotating mass. Alternatively, operation by means of a piezo motor or other suitable drive forms are also possible.

The controller (not shown) is configured for example as a control board with a processor which operates the motor in controlled manner based on instructions from a memory installed in the drive device, e.g. a Read-Only-Memory (ROM). The control parameters may include frequency, oscillation amplitude and certain temporal variations thereof as well as the application duration itself.

In one embodiment, various programs (e.g., for children or varying degrees of tooth hardness or sensitivity) are selectable via a switch (not shown) mounted on the housing of the drive device.

The display device 14 for drive device 10 of the present embodiment shows for example a selected mode, the operating state (on/off) and/or the time remaining for the application. In a preferred embodiment, the display device 14 is mounted on one side of the drive device 10 in such manner that it can be viewed in the bathroom mirror during use (reverse-image character display, see FIG. 2A). In a particularly preferred embodiment, as represented in FIG. 2A, an e-ink display is provided on the front side, and displays a timer countdown during use and the charging state of rechargeable battery when on standby.

In one embodiment of the present disclosure, the drive device 10 including rechargeable battery, control board, magnet motor and housing has a combined weight of 60 to 80 grams, a diameter of 30 to 40 mm and a length of 50 to 70 mm. The dimensions and weight of the drive device 10 allow hands-free us of the device after it is switched on. In one embodiment the controller further allows the frequency and amplitude to be varied automatically according to a defined usage profile during the application. The duration of use is also preferably defined between 10 and 90 seconds, particularly preferably 20 and 60 seconds. After switching on, the teeth cleaning device 100 or the drive device 10 switches itself off automatically after the predetermined time has elapsed. In the standby state, the rechargeable battery may optionally be charged automatically via an induction charging platform integrated in a storage container.

With reference to FIGS. 1 and 3A-3D, various preferred embodiments of the coupling section 20 and the spring sections 22a and 22b will now be described. Although the coupling sections are represented in FIGS. 3A-3D as single elements, it should be understood that some embodiments of the present disclosure provide for a single-structure design of the coupling section and one or both of the mouth inserts 30a and 30b, e.g., by means of a 3D-printing process or preferably by injection moulding or vacuum injection moulding. The spring sections are also represented as integral sections of the coupling element in FIGS. 3A-3D. However, it should be borne in mind that some embodiments of the present disclosure provide a detachable connection of each two, three, four or all elements, coupling section 20, spring sections 22a, 22b and mouthpieces 30a, 30b. Particularly preferred, however, is the single-part construction of the coupling section 20 with the spring sections 22a, 22b as shown.

The connection between drive device 10 and the two mouth inserts 30a, 30b is created by means of a coupling section 20 of the carrier structure. It has a length of 25 mm to 45 mm and a width of 7 mm to 20 mm. The weight is between 3 and 10 grams. On the drive side, the coupling section 20 has a borehole 26 (suggested in FIG. 3A) in an end part of the connecting section 24 for the drive device. In the present embodiment, borehole 26 accommodates the fastener, e.g., the vibrating shaft 12 of drive unit 10. Or the pin 12 and the borehole 26 may also be swapped. In one embodiment, the borehole 26 is furnished with a metal bushing, preferably aluminium, to ensure an exact fit.

FIG. 3A is a perpendicular longitudinal cross sections view of a coupling section 20 in a particularly preferred embodiment of the present disclosure. The coupling section 20 has two arms 22, each of which comprises a spring section 22a, 22b (in FIG. 3A-3D, the reference numbers 22a, 22b are not shown again to avoid complicating the figure). In some embodiments, the spring sections extend over the entire length of an arm (see for example FIGS. 3B-3D). The spring sections preferably extend over 20%-100% of the length of a spring-loaded arm, and in particular over 35%-95% or particularly preferably 65%-90% of the arm. The spring sections are formed by a plurality of trough-shaped recesses 28 on the outer flanks of the arms 22 of coupling section 20. The edges of the recesses are preferably rounded, and alternative notch shapes (V-shaped, U-shaped etc.) are also possible. In this case, recesses 28 are created that penetrate up to about half of the thickness of the arms 22. In other preferred embodiments, the recesses penetrate deeper into the arms, e.g. between 50-90%, preferably between 60-80% of the thickness of the arms in the vertical cross section.

In the embodiment of FIG. 3A, after about 7 to 15 mm the connecting section 24 for the drive device is divided into a Y-shape having two separate elements, the arms 22, in each of which, in the case of a two-part construction a borehole may be created on the mouthpiece side to secure the mouth inserts. In the perpendicular cross section shown, the two separate elements 22 have a thickness from 3 to 6 mm and may have a round or oval cross section (perpendicular to the cross section represented). The arms 22 are furnished with multiple notches 28 to improve their flexibility.

The coupling section 20 is preferably made from the same material as the carrier structures and base elements of the mouth inserts 30a, 30b for improved control of natural resonance behaviour. Most preferably, a biocompatible material such as biocompatible polyamide should be used. Particularly preferred is the use of PA6, PA11, (preferred) PA6.6 or PA12. In one embodiment, polyamide 12 is used e.g., in the embodiment PA 2200 (white) or PA 2201 (transparent) for manufacturing the coupling sections 20.

Figure 3B:
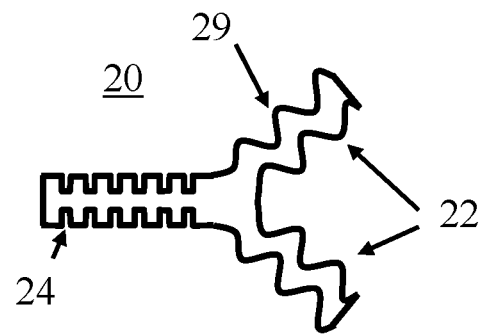

FIG. 3B shows a further embodiment of a coupling section 20 of a carrier structure of the present disclosure. In this case, the arms 22 have coupling sections 29 which are in the form of serpentine elements bending upwards and downwards in the vertical plane. Other variations of the serpentine shape, e.g. in the horizontal plane (transverse plane of the human body and perpendicular to the image plane shown) or as helical or spiral elements are possible, but not shown explicitly. The arms of the spring sections are preferably tapered compared to the arms 22 without spring sections. In one embodiment, the thickness of the arms in the region of the spring sections is equal to 10-50%, preferably 20-40% of the thickness of the arms without the spring sections.

The connecting section 24 for the drive device may optionally also comprise spring sections, as shown in FIG. 3B or, as represented in FIG. 3B for exemplary purposes, it may be provided in the form of a spring section extending between the drive device and the connecting point of arms 22. Here, they are provided in the same positions on the upper- and underside of the connecting section 24 for the drive device. Corresponding spring sections may also be provided as spring sections 22a, 22b. However, the most important features for the effects of the present disclosure are the spring sections of arms 22.

Figure 3C:
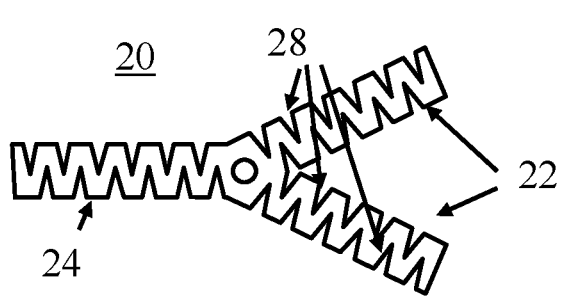

FIG. 3C shows a further embodiment of a coupling section 20 of the present disclosure. Here, the arms 22 and the connecting section 24 for the drive device are provided with the same spring profile, in the form of V-shaped recesses 28 created alternatingly in the upper- and underside of the arms 22 and of the connecting section 24 for the drive device.

Figure 3D:
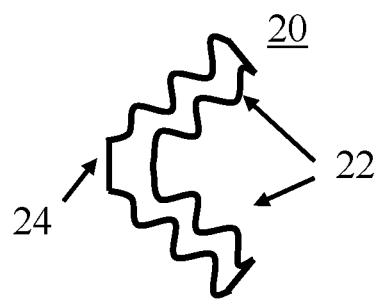

FIG. 3D shows a further embodiment of a coupling section 20 of a carrier structure of the present disclosure. Here, the arms 22 are formed by bending the tapered arms 22 upwards and downwards, similarly to FIG. 3B. In this case, however, the connecting section 24 for the drive device is not provided as an additional arm, but as a simple attachment means (e.g., an aperture, borehole or pin) in the position where the arm 22 converge. This embodiment of the connecting section 24 for the drive device is compatible without limitation with the versions of the arms according to FIGS. 1 and 3A-3C.

Figure 4A:
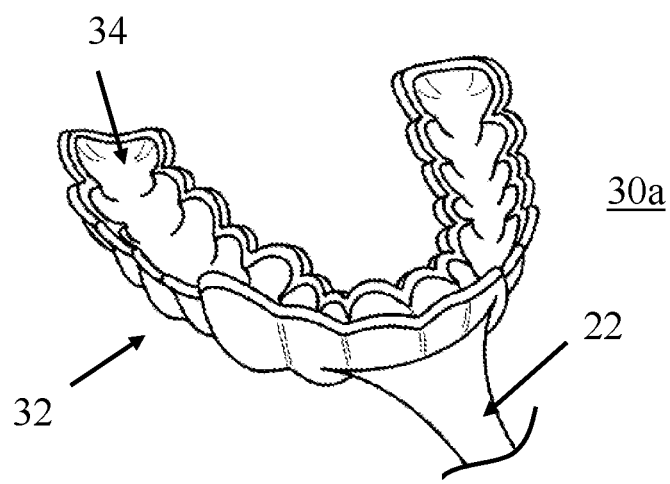
FIG. 4A is a perspective view of a carrier structure for the upper jaw according to an embodiment of the present disclosure.
Figure 4B:
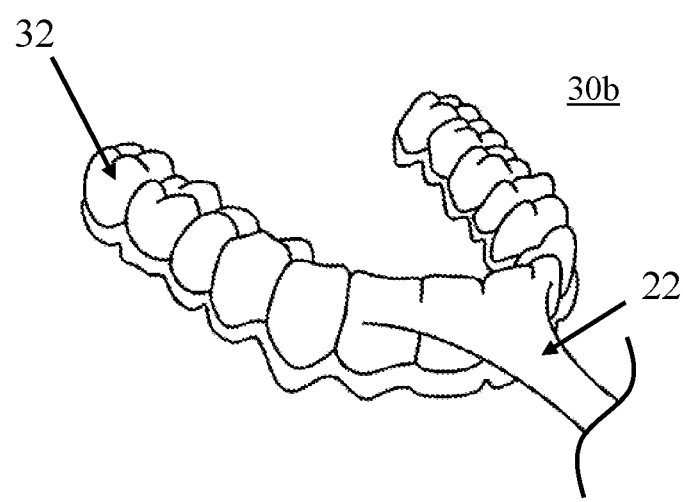
FIG. 4B is a perspective view of a carrier structure for the lower jaw according to an embodiment of the present disclosure.

FIG. 4A is a perspective view of a mouth insert for the upper jaw according to an embodiment of a carrier structure of the present disclosure. FIG. 4B is a perspective view of a mouth insert for the lower jaw according to an embodiment of a carrier structure of the present disclosure. According to FIGS. 4A and 4B, the mouth inserts 30a and 30b comprise a base element 32 and an insert element 34. The base element 32 is connected to one of the arms 22 of the coupling section 20. As was explained previously, this connection may be created with a one-piece construction or a detachable connection (threaded or plug-in connector).

In a particularly preferred embodiment of the disclosure, the mouth insert elements 30a, 30b are accordingly realised in a two-part construction. Base element 32 has the function of transferring the vibrations to the cleaning surfaces and optionally consists of biocompatible polyamide. Biocompatible polyamide has a wide range of application capabilities in medicine and is used for example for stents, catheters, implants, etc. Although the anatomy of the human dentition varies from subject to subject, 6 to 8 variously dimensioned base elements 32 are enough to approximately replicate the dental anatomy of 98% of all adults. The lateral surfaces of the base elements 32 have a mesh-like network structure (not shown) and extend upwards approximately as far as the gingival margin. The pivot spring sections represented in FIGS. 5A and 5B (which will be described subsequently) enable greater flexibility and further reduction of the number of different base elements models needed.

The base elements 32 preferably have a wall thickness from 0.8 to 1.5 mm and weigh between 3 and 6 grams. The distance from the surfaces of the tooth sides is between 1 and 5 mm. The outer surfaces are preferably polished smooth, while the inner surfaces have a coarse or roughened structure designed to improve the connection with the insert element 34 and a silicone shell (not shown). In one embodiment, the construction may have the form of a mesh-like array of intersecting filaments on the surface of the inner faces, wherein the distances between adjacent parallel filaments are preferably between 0.5 mm and 2 mm. The base elements 32 are produced in an industrial injection moulding process or a 3D printing process.

Figure 5A:
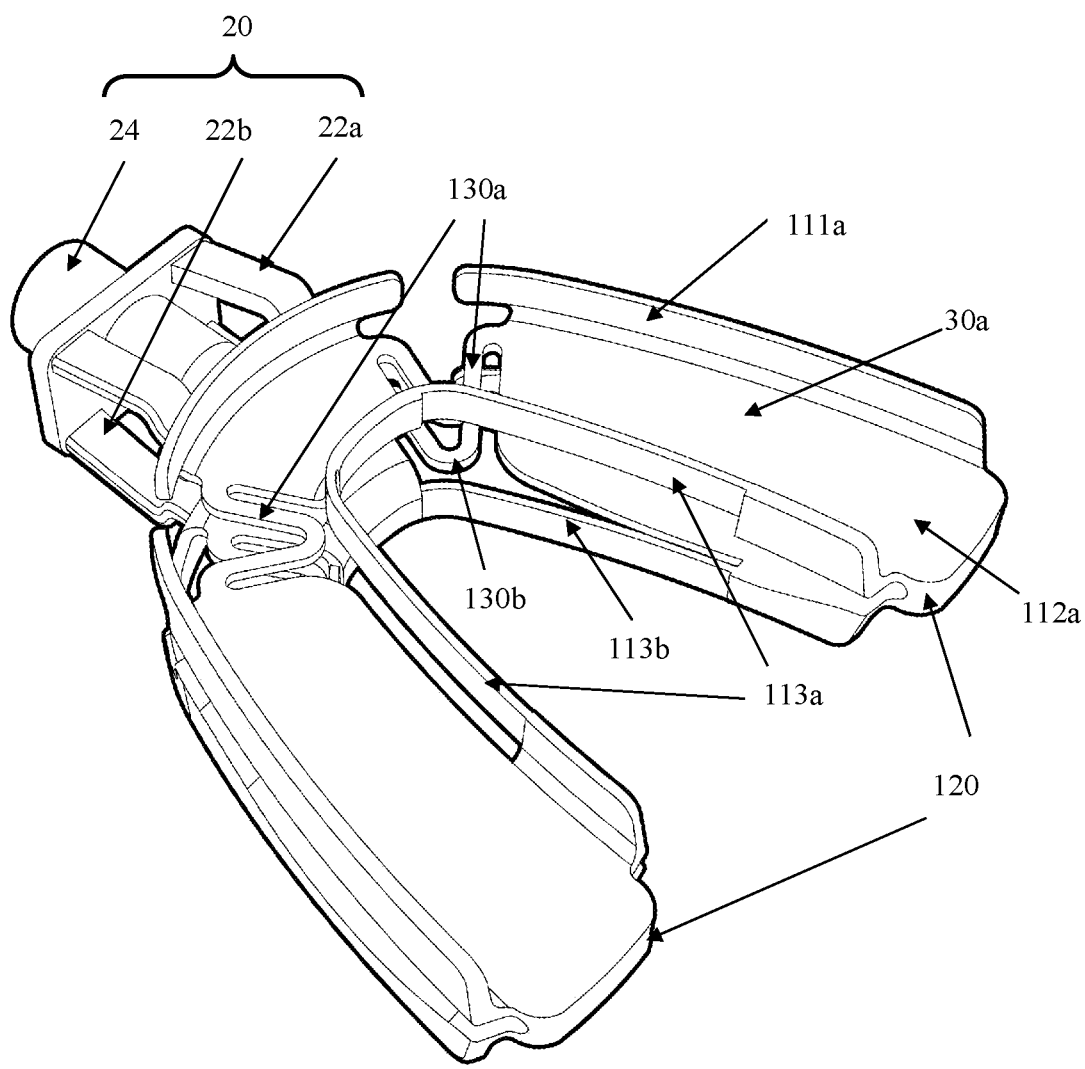
FIG. 5A is a perspective view of a carrier structure for a teeth cleaning device according to an embodiment of the present disclosure.

A carrier structure according to a second preferred embodiment of the disclosure is illustrated in FIG. 5A. In general, it should be noted that the second embodiment shown in FIG. 5A is compatible without limitation with the spring sections 22a and 22b, as was also explained earlier with reference to the first embodiment of the carrier structure, but that it may also be implemented independently thereof. The rather trough-like or box-like shape of the carrier structure cross section may also be used without the pivot spring sections 130a/130b in the region of the teeth, as will be described in detail subsequently. Particularly preferred is the box-like cross section combined with a silicone shell according to the present disclosure.

As shown in FIG. 5A, the carrier structure of the present embodiment comprises a mouth insert for the upper jaw 30a and a mouth insert for the lower jaw (no reference sign). Similarly to the mouth inserts and mouth insert elements of the first embodiment, mouth insert elements of the second embodiment are also of substantially symmetrical construction, and the following description is simplified accordingly.

Each of the mouth insert elements 30a, 30b comprises a carrier structure bottom 112a, which substantially reproduces the shape of the occlusal surfaces of human dentition. Preferably, as shown in FIG. 5A, the mouth insert elements 30a, 30b comprise an outer wall 111a and an inner wall 113a, 113b, each of which extends approximately at right angles from the carrier structure bottom 112a and may serve to support or fasten a silicone shell, as described previously. Outer wall 111a and inner wall 113a, 113b extend substantially continuously along the inner and outer edges of the carrier structure bottom 112a, but are separated by a gap in the region of the back molars to make it easier to pull a silicone shell over the carrier structure during assembly, for example. In the present embodiment, the mouth insert elements 30a, 30b are constructed or joined to each other integrally or by bonding, welding or by design as a single part in the hindmost end region 120 of the back molars. The mouth inserts 30a, 30b thus have a substantially trough-like cross section with walls which extend substantially vertically from the trough bottom. The corners between the walls and the bottom formed thereby are preferably rounded.

Approximately in the region of the canine teeth, in FIG. 5A the mouth insert elements 30a, 30b of the carrier structure in the present embodiment may have a pivot spring section 130a/130b. As shown in the illustration, this is formed by recesses in both the carrier structure bottom 112a and outer wall 111a (optionally in the inner wall 113a/113b as well, though not shown here) of the mouth insert elements 30a, 30b, so that the mouth insert elements 30a, 30b are each divided by serpentine and/or tapered sections in the plane of the carrier structure bottom 112a. The pivot spring section 130a/130b allows a certain freeplay of the carrier structure in the user's occlusal plane, thus enabling adaptability to the individual's specific dentition without interfering with the transfer of vibration to the rear region (back molars), since the pivot spring sections 130a/130b only enhance flexibility in the occlusal plane (transverse plane), and because of their flattened design in the occlusal plane hardly affect the transfer of vibrations through the mouth insert elements 30a, 30b to the back molars. It should be noted that while the number of two pivot spring sections 130a/130b per mouth insert element 30a, 30b is preferred, one or more than two pivot spring sections may also be provided.

The pivot spring sections 130a/130b of the mouth insert elements 30a, 30b in this embodiment of the carrier structure may be designed similarly to the design of the spring section 22a, 22b in the first embodiment, the description of which is referenced generally in this context. Preferred are structures formed by recesses, notches or serpentine shapes created by bending. Particularly preferably, however, the shape of the pivot spring sections 130a/130b is created by forming the carrier structure in an injection moulding or 3D printing process. It should also be borne in mind that the spring sections 22a, 22b of the first embodiment enable springiness in a vertical plane, basically parallel to the space between the front incisors, whereas the pivot spring sections 130a/130b should be rather more rigid in precisely this direction. The preferred oscillation/resilience of the pivot spring sections 130a/130b is parallel to carrier structure bottom 112a and in the cross section, to the trough bottom of the carrier structure of the second embodiment.

As is represented in FIG. 5A, the mouth insert elements 30a, 30b are connected to each other via upper and lower spring sections 22a, 22b in the region in front of the incisors, and the spring sections 22a, 22b are further connected to the connecting section 24 for the drive device, which is adapted for coupling with a drive unit (e.g., a vibration motor). The spring sections 22a, 22b in this embodiment are each formed by a single bend in the arms, i.e. slightly outwardly from the connecting section 24 for the drive device (cranially for the spring sections 22a of the carrier structure 30a of the upper jaw, correspondingly caudally for those of the lower jaw) and again slightly more steeply inwards again towards the connecting point for about ¾ of the distance to the connecting point with the respective mouth insert 30 a/b. The number of arms connecting the mouth inserts to the connecting section 24 for the drive device is four in the present embodiment, two arms for the upper mouth insert and two for the lower one, although the invention is not limited to this number. Implementations of the present embodiment having one or more than two arms for each mouth insert element 30a, 30b are also possible. The connecting section 24 for the drive device and the spring sections 22a, 22b together form part of the coupling section 20. The connection to the drive unit is preferably made via a plug-in connector. However, alternative connection methods are also conceivable (e.g. threaded connection), and the invention is not intended to be limited thereto.

Figure 5B:
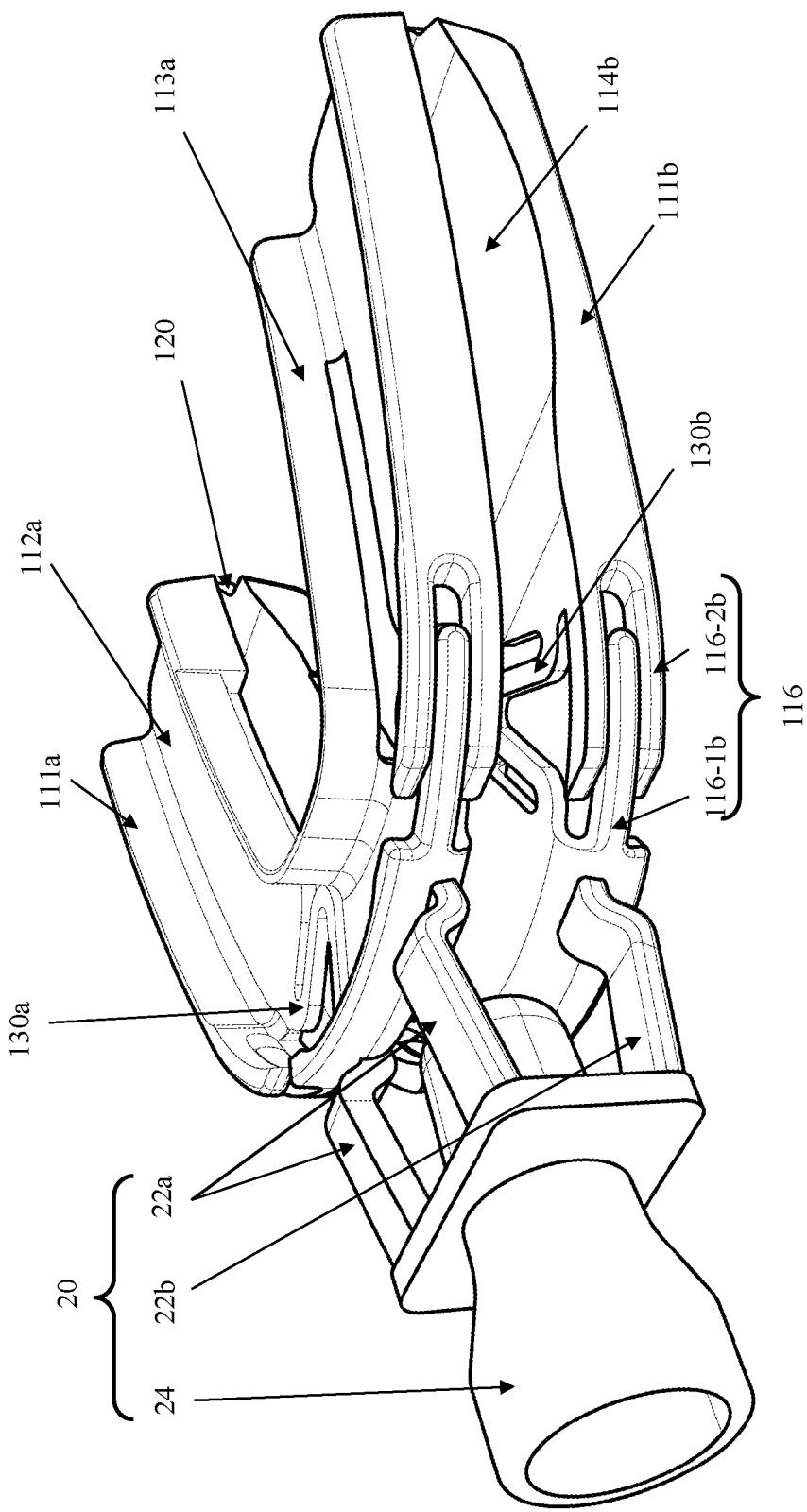
FIG. 5B is a perspective view of a carrier structure for a teeth cleaning device according to a further embodiment of the present disclosure.

FIG. 5B shows a perspective view of a carrier structure of a teeth cleaning device according to a further embodiment of the present disclosure. The embodiment of carrier structure illustrated in FIG. 5B is substantially similar to the carrier structure represented in FIG. 5A and the description of the identical components will not be repeated here, such a description being replaced by a general reference to the earlier description of FIG. 5A. The differences from the embodiment of FIG. 5A consist firstly in that the recesses in the outer walls 111a and 111b are each bridged by a vibration coupling mechanism 116b and that the lower carrier structure bottom 112b has a convex protrusion 114b bulging outwards, i.e. towards the teeth. The reference signs for the vibration coupling mechanism of the upper outer wall 111a have been omitted, but the following description is also applicable correspondingly for the upper mouth insert 30a.

The vibration coupling mechanism 116b of this embodiment enhances the transfer of vibrations to the back teeth (molars) and is thus able to improve the cleaning effect of the teeth cleaning device. The vibration coupling mechanism 116b comprises a first coupling section 116-1b and a second coupling section 116-2b, which are arranged on opposites sides of the recess in the outer wall 111b, extend towards each other and touch each other. In the present embodiment, the first coupling section 116-1b is formed in the region of the incisors as a tapered extension of the outer wall 111b which engages in a corresponding U-shaped extension of the opposite outer wall 111b in the region of the premolars. This principle may also be reversed, or alternative engagement methods may be provided, and it should therefore not be interpreted as limiting. For example, V-shaped or W-shaped projections are also possible, as is a rotation of the principle explained through 90° about an axis extending through the middle of the outer wall 111b at the corresponding site. The length of the contact surface between the coupling sections 116-1b and 1116-2b enables the transfer of vibrations to the back molars to be adapted, e.g. optimised for certain frequency ranges. By way of example, a contact surface length of 1 to 10 mm, preferably 2 to 7 mm is advantageous for frequencies between 100 Hz and 500 Hz, more preferably 200 Hz to 350 Hz. The contact surface between the coupling sections also varies according to the deformation of the pivot spring sections 130a and 130b, so that different lengths may be provided for different dentition profiles.

The convex protrusion 114b in the lower mouth insert 30b serves to adapt the shape to the anatomy of the human dentition in this region, particularly to the curve of Spee. This variant is optional and can also be realised with a corresponding formation in the silicone shell.

Figure 6:
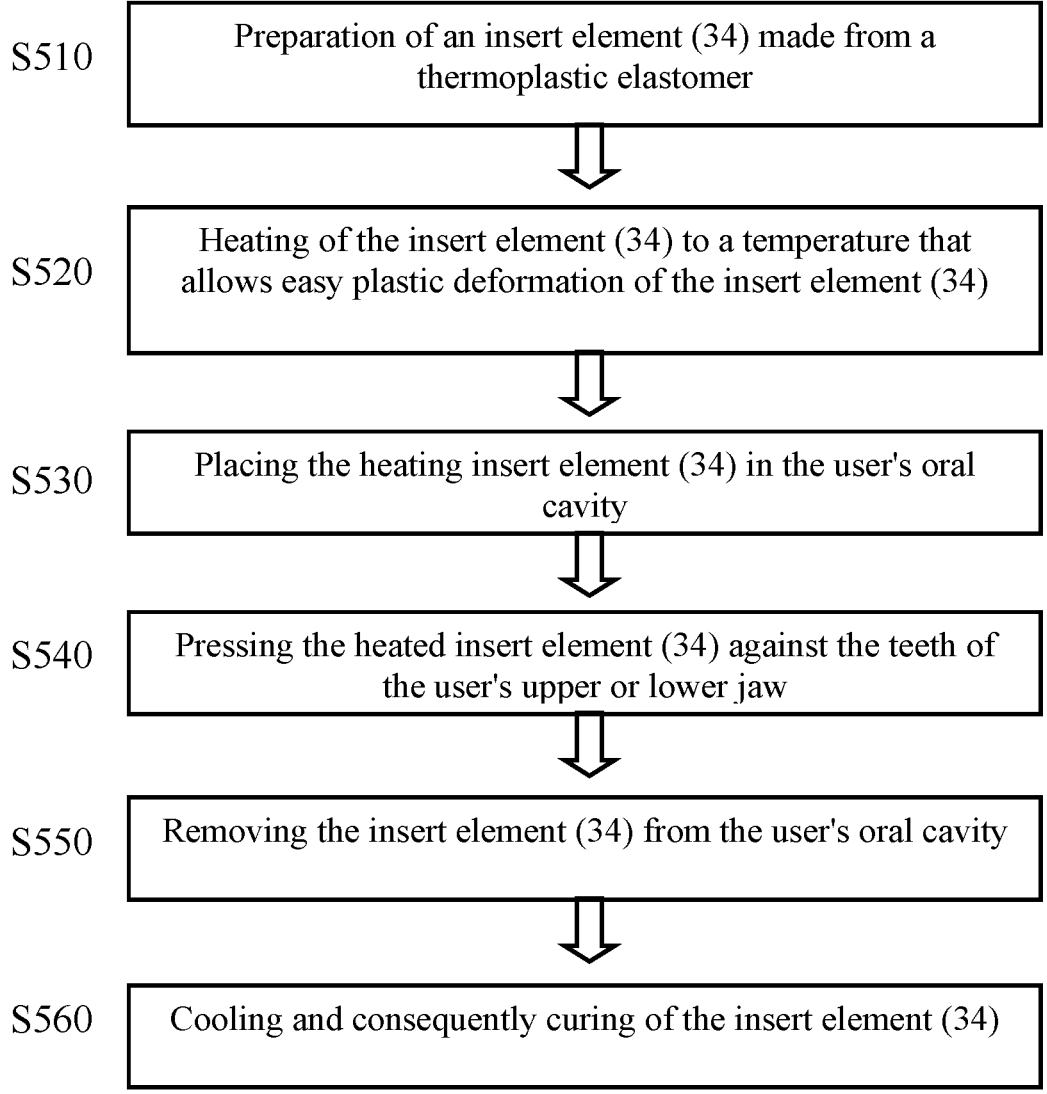
FIG. 6 is a flowchart of an adaptation method for a mouth insert according to an embodiment of the present disclosure.

Two methods are suitable for realising an exact adaptation to the user's dental anatomy. One adaptation method is coating with thermoplastic elastomers, which is represented as a flowchart in FIG. 6.

In such an embodiment, thermoplastic materials, preferably elastomers are spread onto the inner surfaces of the element 32 or inserted as therein as inserts which are fixed in the mesh structure of the side surfaces. The preferred thermoplastic elastomers are plastics which behave similarly to the classic elastomers at room temperature, but which are plastically deformable with the application of heat and thus exhibit thermoplastic behaviour. In one embodiment, the coating or insert body has a wall thickness of 1 to 5 mm and overlaps the gingiva by 2 to 4 mm.

On the inner sides, the elastomer may have rhomboid or pimpled or cylindrical cleaning structures. The diameter of such a structure is preferably between 0.2 and 0.4 mm. The gap between the side lines of 2 structures is 0.2 to 0.4 mm. The gaps have a depth from 0.5 to 1 mm. The various geometries may be combined with each other without restrictions.

As soon as the correct base size of base element 32 has been selected for the user, the mouth insert is placed in a hot water bath for a certain period (e.g., 30-60 seconds). The temperature of the water bath is preferably above human body temperature (approx. 37° C.) and lower than a temperature which would cause the user significant discomfort during the subsequent adaptation process (approx. 70° C.). The preferred temperature range is between 30° C. and 60° C., and particularly preferably between 35° C. and 50° C. The elastomer structure of the mouth insert is then modelled against the lateral tooth surfaces and the gingival margin in the user's mouth by hand. After it has been adapted, the mouth insert is placed in cold water (e.g., between 0° C. and 20° C., preferably between 4° C. and 15° C.) for a suitable period, e.g., 20-40 seconds) and can then harden. In one embodiment, additives (crosslinking agents) may be included in the cold water to promote or reinforce the curing of the thermoplastic material.

As was discussed previously, in one embodiment a thermoplastic elastomer is used as the thermoplastic material. Preferred among these substances are polycaprolactone (PCL), e.g., Polydoh® by Polymorph, thermoplastic polyester elastomer TPE-E, e.g. Keyflex® by LG Chemie, urethane-based thermoplastic elastomer TPE-U, e.g., Elastollan® (BASF), or mixtures thereof. All of these preferred substances exhibit suitable thermoplastic deformability between 60 and 65° C. They have a glass temperature from minus 60 to 70° C. Even at a temperature that allows the thermoplastic deformation, the elastomers remain dimensionally stable as long as no active reshaping is carried out, for example by applying manual pressure. The temperature at which the elastomers become deliquescent under the effects of gravity are higher than 130° C. If the materials are placed in a water bath at a temperature of 70° C. for 45 seconds, they remain (thermoplastically) deformable for about 2 to 3 minutes even though the surface thereof has already cooled to about 35° C. before they are placed in the user's mouth for adaptation. Their shape is stabilised after pressing against the user's dentition profile by immersing them in a cold water bath. A further rest period of 24 hours may be required before they have finally hardened completely. Additives or reinforcing fibres may also be added optionally.

A particularly desirable property of the thermoplastic elastomers listed above consists in that they can be adapted again as often as required. For this, they have to be placed in a water bath (e.g. at 70° C.) again for a certain period (e.g., 45 seconds). This means that rinsing with hot water alone cannot cause deformation. If deformation does occur under extreme conditions (e.g., exposure to direct, strong sunlight), this can also be corrected easily by carrying out the same procedure as for the initial adaptation again. The optional addition of crosslinking agents to the water bath during the adaptation might permanently prevent any repeat adaptation.

The mesh structure of the biocompatible polyamide of the base element 32 is sufficient to ensure the effective transfer of vibrations, while the modelled elastomer of the insert element 34 enables satisfactory adaptation to the user's anatomy.

An alternative embodiment of the present disclosure comprises the attachment of strip brushes. Strip brushes have a continuous stock and can be cut exactly to the length and width of the cleaning surface. Nylon or fibres in soft, medium and hard variants represent suitable brush material. They may be anchored in a milled groove or bonded to the inner surfaces of the mouth inserts.

COMPARISON EXAMPLES

Apart from the chemical (toothpaste) and kinetic (dynamic liquid flow) effect of the teeth cleaning device of the present disclosure, the mechanical cleaning motion is also significant for the cleaning result. The mechanical effect is created by the amplitude of the vibration motor of the drive device 10. This is in exponential correlation to the frequency, which is controlled by the processor via the voltage. Although the amplitude generated at the motor itself is manifested as torsional force, at the target site, the mouth inserts 30a, 30b, it is measurable as a spatial displacement. The magnitude of the displacement is critically dependent on the transfer path selected. In the patent application DE 102015109891 A1 discussed earlier, a coupling device with a linear transfer path is described, which needs two separate vibrating motors in order to operate two separate mouth inserts. With the coupling 20 described in this case, both mouth inserts may be caused to vibrate at the same time using a magnet motor and without having to accept a deterioration of the vibration amplitude—or consequently the cleaning effect—particularly in the region of the incisors.

A sufficient mechanical cleaning effect is achieved if a spatial shift of at least 0.08 mm, preferably at least 0.12 mm takes place at the target site. In order to be able compare the displacement of a rigid coupling (i.e. a coupling via two single motors or a rigid connecting element for a single motor according to DE 102015109891 A1) with a spring-loaded coupling section according to the present disclosure, the spatial shift was measured at two defined points of the mouth inserts in comparison tests. Measuring point I is located 10 mm to the side of the middle of the fastener and measuring point II is located 70 mm away in the direction of the molars. A device having two motors according to DE 102015109891 A1 was used to supply the measurement value for comparison. The measurements from the spring-loaded coupling according to the present disclosure were taken with a coupling section according to FIG. 3A made from biocompatible polyamide (polyamide 12).

| Comparison measuring point I | Spring-loaded measuring point I | Comparison measuring point II | Spring-loaded measuring point II |
| --- | --- | --- | --- |
| 0.06 mm | 0.17 mm | 0.24 mm | 0.29 mm |

The measurement results are average values calculated from 50 measurements taken at each of the two measuring points with a maximum deviation of ±11% relative to the average displacement.

Although the mechanical effect is adequate in the region of the molars with both couplings, when the Y-shaped component is used the displacement in the region of the front teeth is almost three times greater than the displacement created with the linear component. Thus, an adequate mechanical cleaning effect can be achieved in the region of the front teeth as well with the geometry of the Y-shaped coupling.

ADVANTAGES OF THE INVENTION

The present invention enables a considerable improvement in cleaning quality due to uniform pressure and cleaning of all tooth surfaces.
  optimum cleaning standard, since user errors are eliminated by the automatic cleaning process.
  protection of the gingival margin from injury by manually guided toothbrushes.
  considerable time savings (in ideal conditions 10-30 seconds 3 minutes with manual cleaning)

With the adaptation method described and the described combination of carrier structure (e.g. FIG. 5) with a silicone shell, it is also possible to manufacture larger numbers of precisely fitting cleaning aids inexpensively and without diminishing the effect of the improved coupling section of the present disclosure.

APPLICATION EXAMPLE OF THE FULLY AUTOMATED TOOTH CLEANING INSTRUMENT

The user takes the mouth inserts 30 out of a storage container and if necessary connects them to the coupling section. He sprays or spreads the mouth and tooth care agent on the cleaning surfaces of the mouth inserts 30 and if necessary connects the drive 10 to the coupling section. He places the mouth inserts 30 in his mouth and brings them into contact with his teeth. Since the mouth inserts 30 are produced to ensure a perfect fit, displacement inside the oral cavity is not possible. The cleaning program is started by pressing the power button. During the cleaning program, which lasts from 20 to 50 seconds, the processor optionally alters the frequency and consequently also the amplitude of the vibration motor multiple times. When the cleaning program is complete, the instrument is switched off automatically. After the mouth inserts have been rinsed off in running water, the instrument is placed in a disinfectant solution in the storage container.

For persons skilled in the art, it will be obvious that various modifications and variations may be made to the structure of the present invention without departing from the scope of protection or the essence of the invention. Regarding the preceding notes, it is intended that the present invention should encompass the modifications and variations of this invention if they fall within the scope of protection of the following claims and their equivalents.

What is claimed is:
1. Carrier structure for a teeth cleaning device (100) for the simultaneous cleaning of multiple, preferably all of a user's teeth, comprising:
  a mouth insert (30a) for the user's upper jaw and a mouth insert (30b) for the user's lower jaw; and
  a coupling section (20) including at least two arms (22) and a connecting section (24) for a drive device, wherein the mouth inserts (30a, 30b) are each connected to an arm (22) of the coupling section (20) and the connecting section (24) for the drive device is adapted so that it can be connected to the drive device (10) via a fastener (12) thereof,
  wherein
  the arms (22) of the coupling section (20) that are connected to the mouth inserts (30a, 30b) each include at least one spring section (22a, 22b).
2. Carrier structure according to claim 1, wherein at least one of the mouth inserts (30a, 30b) comprises a first mouth insert section and a second mouth insert section, which are connected to a pivot spring section (130a, 130b) which is less rigid in the plane of a dentition extending substantially parallel to and between the mouth inserts (30a, 30b) than the first and second mouth insert sections in order to facilitate a deformation of the respective mouth insert (30a, 30b) in the plane of the dentition.
3. Carrier structure according to claim 1, wherein the mouth inserts (30a, 30b) are each adapted for cleaning the teeth in the user's entire upper jaw or the entire lower jaw.

4. Carrier structure according to claim 1, wherein the coupling section (20) is constructed as a single part with the spring sections (22a, 22b).

5. Carrier structure according to claim 1, wherein the spring sections (22a, 22b) are replaceable by means of plug-in or threaded connectors.

6. Carrier structure according to claim 1, wherein the spring sections (22a, 22b) are constructed as a single part with the mouth inserts (30a, 30b).

7. Carrier structure according to claim 1, wherein the spring sections (22a, 22b) are tapered compared with the arm (22) of the coupling section (20) to which they are connected, and arranged as an up and down bent S-structure or a curved structure.

8. Carrier structure according to claim 7, wherein the tapering of the arms (22) of the coupling section (20) is created by flattening of the respective arms (22) of the coupling section (20) and these then form the S-shape (29) by bending the flattened arms upwards and downwards in the plane that extends lengthwise through the arms (22) and the connecting section (24) for the drive device of the coupling section (20).

9. Carrier structure according to claim 1, wherein the spring sections (22a, 22b) are formed by a plurality of notches (28) on the outer sides and/or the inner sides of each of the arms (22) of the coupling section (20).

10. Carrier structure according to claim 9, wherein the spring sections (22a, 22b) are formed by recesses (28) on the outer sides of the arms (22) of the coupling section (20 or alternatingly and offset with respect to each other on the outer and inner sides of the coupling section (20), which extend perpendicularly to the longitudinal axis of the respective arm (22) and cut at least as far as halfway into to the respective arm (22).

11. Carrier structure according to claim 1, wherein the connecting section (24) for the drive device of the coupling section (20) is constructed as an additional, third arm, which extends from a connecting point of the two arms (22) that are connected to the mouth inserts (30a, 30b), and wherein the third arm optionally comprises an additional spring section.

12. Carrier structure according to claim 1, wherein the carrier structure is made from homo- or copolyamide, preferably food-safe homo- or copolyamide, further preferably from PA 6, PA, 6.6, PA 4.6, PA 11, PA 12, PA 1010, PA 610, copolyamides or polyamide mixtures thereof, and particularly preferably PA 6.6 or copolyamides or polyamide mixtures therewith.

13. Carrier structure according to claim 1, wherein the mouth inserts (30a, 30b) each comprise:
a base element (32) of a biocompatible polyamide which has been adapted roughly to a shape of the teeth of a user's lower jaw or upper jaw; and
an insert element (34) made from a thermoplastic elastomer which is affixed to the inner sides of the base element and is adapted to match a shape of the user's lower jaw or upper jaw dentition perfectly.

14. Carrier structure according to claim 13, wherein the inner sides of each base element (32), which serve as a fastener for the insert element (34), have a mesh-like network structure to improve the connection between the base element (32) and the insert element (34).

15. Carrier structure according to claim 13, wherein the insert elements (34) each have a multiplicity of cleaning structures on the surfaces facing the user's teeth.

16. Carrier structure according to claim 1, wherein the mouth insert (30a) for the user's upper jaw and the mouth insert (30b) for the user's lower jaw are connected to each other by the ends thereof located opposite the coupling section (20).

17. Carrier structure according to claim 1, wherein the coupling section (20) comprises four arms (22), wherein respectively two arms are connected to the mouth insert (30a) for the user's upper jaw and the mouth insert (30b) for the user's lower jaw.

18. Mouthpiece, comprising:
a carrier structure according to claim 1, and
a silicone shell which substantially completely surrounds the carrier structure.

19. Mouthpiece according to claim 18, wherein the silicone shell (200) is manufactured as a single part and preferably in a vacuum injection moulding process.

20. Teeth cleaning device (100), comprising:
a carrier structure according to claims 1; and
a drive device (10) which is connected to the connecting section (24) for the drive device of the carrier structure and is adapted to transfer an oscillation of 100 Hz to 500 Hz, preferably 200 Hz to 350 Hz to the mouth inserts (30a, 30b) via the Y coupling section (20).

21. Teeth cleaning device (100) according to claim 20, wherein the drive device (10) is adapted to cause the coupling section (20) and the mouth inserts (30a, 30b) to vibrate in a plane, preferably to vibrate in a sinusoidal curve corresponding to the plane in which the arms (22) of the coupling section (20) are aligned.

22. Teeth cleaning device (100) according to claim 20, further comprising:
a silicone shell which substantially completely surrounds the carrier structure.

23. Carrier structure for a teeth cleaning device (100) for the simultaneous cleaning of multiple, preferably all of a user's teeth, comprising:
a mouth insert (30a) for the user's upper jaw and a mouth insert (30b) for the user's lower jaw; and
a coupling section (20) having two arms (22) and a connecting section (24) for a drive device wherein the mouth inserts (30a, 30b) are each connected to an arm (22) of the coupling section (20) and the connecting section (24) for the drive device is adapted so that it can be connected to the drive device (10) via a fastener (12) thereof,
wherein
at least one of the mouth inserts (30a, 30b) comprises a first mouth insert section and a second mouth insert section, which are connected to a pivot spring section (130a, 130b) which is less rigid in the plane of a dentition extending substantially parallel to and between the mouth inserts (30a, 30b) than the first and second mouth insert sections in order to facilitate a deformation of the respective mouth insert (30a, 30b) in the plane of the dentition, wherein the arms (22) of the coupling section (20) that are connected to the mouth inserts (30a, 30b) each include at least one spring section (22a, 22b).

24. Carrier structure according to claim 23, wherein the mouth inserts (30a, 30b) each have a trough shaped cross section which is formed by
a carrier structure bottom (112a) that substantially resembles the shape of the occlusal surface of a set of human teeth,
an outer wall (111a, 111b) and
an inner wall (113a, 113b).

25. Carrier structure according to claim 24, wherein the outer walls (111a, 111b) each have a recess in the region of the pivot spring sections (130*a*, 130*b*) which is bridged by a vibration coupling mechanism (116*b*).

26. Carrier structure according to claim 25, wherein the vibration coupling mechanisms (116*b*) each comprise a first coupling section (116-1*b*) and a second coupling section (116-2*b*), which are arranged on opposite sides of the recess in the outer wall (111*a*, 111*b*), extend towards each other and touch each other.

* * * * *